ECHO SOUNDING METHOD AND APPARATUS

Filed Sept. 15, 1967

INVENTORS.
HANS BOSTROEM
FRIEDRICH HOWEY
BY
McGlew & Toren
ATTORNEYS.

INVENTORS.
HANS BOSTROEM
FRIEDRICH HOWEY
BY
McGlew & Toren
ATTORNEYS.

United States Patent Office
3,439,318
Patented Apr. 15, 1969

3,439,318

ECHO SOUNDING METHOD AND APPARATUS

Hans Bostroem, Farsta, Sweden, and Friedrich Howey, Bremen, Germany, assignors to Aktiebolaget Bofors, Bofors, Sweden Continuation-in-part of application Ser. No. 460,933, June 3, 1965, which is a continuation-in-part of application Ser. No. 219,820, Aug. 23, 1962. This application Sept. 15, 1967, Ser. No. 668,140
Claims priority, application Germany, Aug. 24, 1961, A 38,179
Int. Cl. G01s 9/68
U.S. Cl. 340—3 6 Claims

ABSTRACT OF THE DISCLOSURE

The disclosure is directed to an echo sounding method and apparatus in which impulses are transmitted at the start of successive sounding periods having lengths, between successive transmitted impulses, corresponding to a sounding range which is a multiple of the selected sounding range and in which there are counted only those echo impulses received during a selected limited sound receiving portion of each sound receiving period, the portion having a length which is a fraction of that of the associated sounding period. The successive sound receiving portions are counted, and there is measured the elapsed time, at which an echo impulse, responsive to a transmitted impulse initiating a sounding period, is received in the sound receiving portion of the associated sounding period, only during sound receiving portions which are spaced, in time, at time intervals which are a multiple of a sound receiving period.

Successive sounding periods of different respective lengths are used in such a manner that periodically recurring disturbance impulses which, with equal length sounding periods, would be received during a sound receiving portion of a sounding period, are received outside the sound receiving portion. Preferably the selection of the lengths of successive sounding periods of unequal length is effected in a periodic manner.

*Cross reference to related application*

This application is a continuation-in-part of our copending application Ser. No. 460,933, filed June 3, 1965, for "Method and Device" and which, in turn, is a continuation-in-part of our application Ser. No. 219,820, filed Aug. 23, 1962, for "Echo Sounding Procedure and Apparatus," and both now abandoned.

*Background of the invention*

A known method of effecting discrimination between desired echo impulses and unwanted disturbance impulses involves counting the frequency of the sounding periods during which impulses occur, and measuring the elapsed time at which an echo impulse is received only at intervals corresponding to a predetermined number of sounding periods. With this known discrimination method, there sometimes exists the possibility of the echo sounding apparatus responding to receiving undesired impulses which differ from the desired echo impulses by one sounding period. This is particularly true if, in the customary manner, sounding periods of the same length or duration are employed. By the term "sounding period" is meant the time interval between successive transmitted impulses, and "elapsed time" means the time between emission of a transmitted impulse and receipt of the resultant echo impulse.

*Summary of the invention*

This invention relates to underwater sound echo ranging operations and apparatus and particularly to arrangements involving a generator, adapted to actuate a transducer to emit a pulse of sound wave energy, and a counting arrangement, to which there are delivered received echo impulses, and which is so designed that it is effective, only after the arrival of received impulses within two or more successive sounding periods, to deliver an indicating or releasing exit pulse to an indicating arrangement. More particularly, the invention is directed to a novel method of and apparatus for discriminating between the desired echo impulses, reflected from an object, and received disturbance impulses.

In accordance with the present invention, the possibility of the apparatus responding to undesired received impulses, which differ from the desired echo impulses by one sounding period, is eliminated by using sounding periods which have time durations or lengths selected from two or more values, the smallest of which values is at least two times larger than a limited portion of each sounding period, hereinafter called the "receiving portion" or "sound receiving period," during which impulses are received corresponding to the selected sounding range. In a preferred manner of utilizing the principles of the invention, the lengths of the sounding periods are varied, preferably periodically, in such a manner that periodically recurring disturbance impulses which, with equal length sounding periods, would be received during such time limited receiving portion of a sounding period, are received outside the limited measuring or receiving time interval of the latter. Preferably, an oscillator is coupled with a generator and also with a counting arrangement, and is so designed that only those impulses received during the selected limited measuring or receiving time portion of each sounding period are directed to the counting arrangement.

*Brief description of the drawings*

For an understanding of the principles of the invention, reference is made to the following description of a typical embodiment thereof as illustrated in the accompanying drawings.

In the drawings.

*Description of the preferred embodiment*

Figure 1:
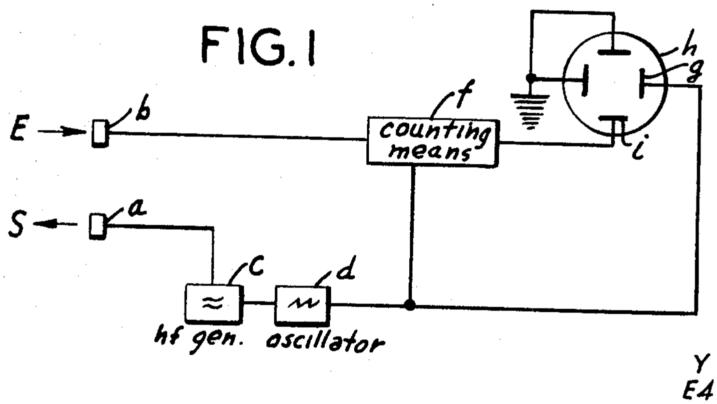
FIG. 1 is a block diagram of echo sounding apparatus for carrying out the method of the invention.

Referring to FIG. 1 of the drawings, in the echo sounding apparatus therein illustrated, transmitted impulses $S_1$, $S_2$, $S_3$, . . . $S_n$ are transmitted at predetermined regular time intervals, each impulse S being transmitted at the start of a sounding period of a certain length P, and the sounding periods periodically recurring. Thus, each sounding period or sounding range is defined by the time interval of the length P between two successive transmitted impulses $S_1$ and $S_2$, or $S_2$ and $S_3$, or $S_3$ and $S_4$. For example, the impulses S may be transmitted by a properly oriented magnetostrictive underwater transmitter *a*, and the echo impulses E reflected by an object within the range of the apparatus are received by a properly oriented receiver *b*.

Transmitter *a* is driven by a high frequency generator *c*. A sawtooth oscillator *d* is coupled with the high frequency generator *c* and with a counting arrangement or means *f* and with the horizontal plates *g* of a cathode ray or Braun tube *h*. By the described means, the luminous spot of the cathode ray tube is deflected in accordance with the echo sounding. Furthermore, the counting arrangement *f* is controlled by sawtooth generator *d* in such a manner that only those impulses of a preselected amplitude received during a selected limited time interval of each sounding period are delivered to counting arrangement *f*. The arrangement counts a preselected number of periods during which such impulses are received, before gating a received impulse to cathode ray tube *h*. The counter impulses either may be desired echo impulses or may be disturbance impulses of such a nature as to fall within the operating range of the apparatus or to have an interference effect with respect to such operating range.

Figure 2A:
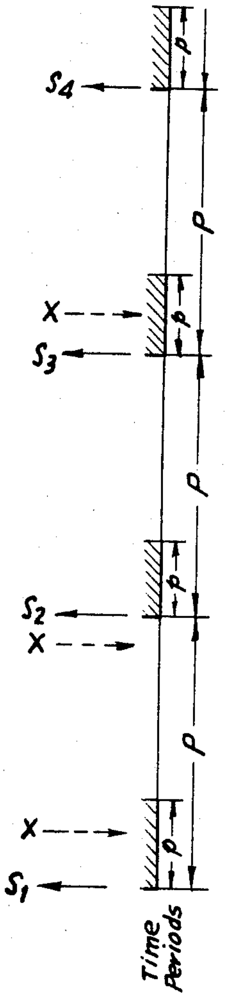
FIG. 2*a* is a graphical illustration of the manner of operation of an echo sounding apparatus with disturbance impulses being received at irregular intervals and with the sounding periods being of uniform and equal length.
Figure 2B:
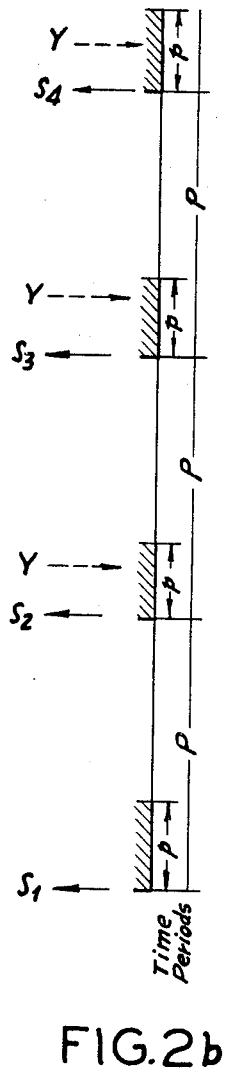
FIG. 2*b* is a graphical illustration of the operation of echo sounding apparatus in which the sounding periods are of equal length and the disturbance impulses are received at regular intervals.

The counting arrangement *f*, and the circuitry involving the cathode ray tube *h*, are so designed that only those impulses received during a certain limited time interval, or receiving portion, of each sounding period, and which are of interest in the particular operation, are observed or measured. For example, transmitted impulses S are transmitted at time intervals of the constant length P corresponding to a range of 50 meters, as best seen in FIGS. 2*a* and 2*b*. Sawtooth generator *d*, by way of example, may control the counting arrangement *f* through the medium of a multi-vibrator in such a manner that the counting arrangement is operative for receiving impulses only during a receiving portion or interval of a length *p* corresponding to a range of from 0 to 15 meters and beginning with the transmitting of impulses $S_1$, $S_2$, $S_3$, respectivevly. Thus, the selected receiving interval of the length *p* corresponds to a selected part of the sounding range, and the sounding period of the length P corresponds to a sounding range of 50 meters which is a multiple of the selected part *p*, of only 15 meters of the sounding range.

Disturbance impulses X from the common disturbance level are regularly distributed statistically over the whole sounding period of the length P so that, for example and as illustrated in FIG. 2*a*, during a first sounding period of the length P, two disturbance impulses X are received, one being received during the selected receiving portion of the length *p* and the other being received outside this selected receiving portion or time interval; in the next sounding period of the length P, no disturbance impulse is received at any time; and in the third sounding period, for example, one disturbance impulse X would be received during the selected receiving portion of the length *p*.

If the counting arrangement *f* is so designed that it is effective only after the arrival of received impulses within the impulse receiving portions, of the length *p*, of three successive sounding periods of the length P, to deliver an indicating releasing exit impulse to the vertical plates *i* of the cathode ray tube *h*, the arrangement already has a considerable degree of discrimination with respect to disturbance impulses of the general disturbance level. This discrimination can be sharpened by narrowing the measurement interval or receiving portion *p* and by increasing the number of successive selected measurement periods between releases of indication releasing pulses, or by correspondingly presetting the percentage of measurement periods during which receiving pulses are released in relation to measurement periods in which releasing receiving pulses do not occur.

With sounding periods of equal lengths P, it may happen, as represented in FIG. 2*b*, that operation may be brought about by echo impulses arriving from an object which is either not of interest or which is at a much greater distance than the normal range of the length P of the apparatus, and which echo impulses have such amplitudes that they interfere within the operating sensibility of the apparatus. Such impulses are indicated at Y in FIG. 2*b*.

Figure 2C:
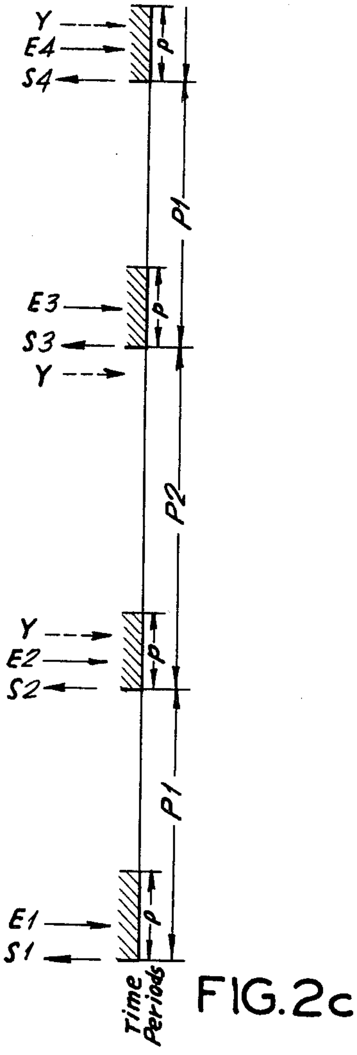
FIG. 2*c* is a graphical illustration of the operation of echo sounding apparatus in accordance with the present invention, and in which the lengths of the sounding periods are periodically varied, with both the desired echo impulses and the disturbance impulses within successive sounding periods of the lengths, P1, P2 and P1, respectively, originating at the same distance.

FIG. 2*c* also illustrates such echo disturbance impulses Y which, for example, at a sounding period P corresponding to a range of the length P equal to 50 meters and a selected receiving portion of the length *p* equal to 15 meters only and covering the part from 0 to 15 meters of each sounding range, are reflected from an object at a distance of about 55 meters. However, for echo impulses from respective distances of 15 and 55 meters, with the two objects having otherwise the same reflectivity properties, there usually is an amplitude difference of only about 28 decibles. Considering variations in the target level and in the propagation patterns, this difference is sometimes too small to discriminate the echos arriving from the objects at the greater distance.

To effect discrimination in this case, the sounding period, as graphically represented in FIG. 2*c*, is made variable. For example, in the particular arrangement graphically illustrated, there is a regular alternation between two different sounding periods, with the length P1 being equal to 50 meters and the length P2 being equal to 65 meters. The sounding periods of the lengths P1 and P2 succeed each other in alternation. While the echo impulses E1, E2, E3 and E4, i.e., the transmitted impulses S1, S2, S3 and S4 reflected from a target at a distance of, for example, 10 meters are recorded in each successive measurement period or receiving portion *p*, only every other disturbance impulse $Y_1$, $Y_3$ of a reflecting object at a distance of 55 meters falls in a selected receiving portion *p*. The intermediate disturbance impulses $Y_2$, $Y_4$ fall in the duration of each sounding period outside of the selected receiving portion *p*.

It will be noted that the respective lengths of the sounding periods P1 and P2 are so selected that the "distance" of an interference pulse Y is between the effective lengths of the two successive sounding periods P1 and P2. Thus, in the specific example of FIG. 2*c*, sounding period P1 has a range of 50 meters while sounding period P2 has a range of 65 meters. The unwanted pulse Y is at a distance of 55 meters, and this distance lies between 50 and 65 meters. Under such circumstances, and by virtue of using the alternating length sounding periods P1 and P2, there occurs a situation wherein the unwanted pulse Y will not appear during the receiving portion *p* of the third sounding period P1.

Figure 3:
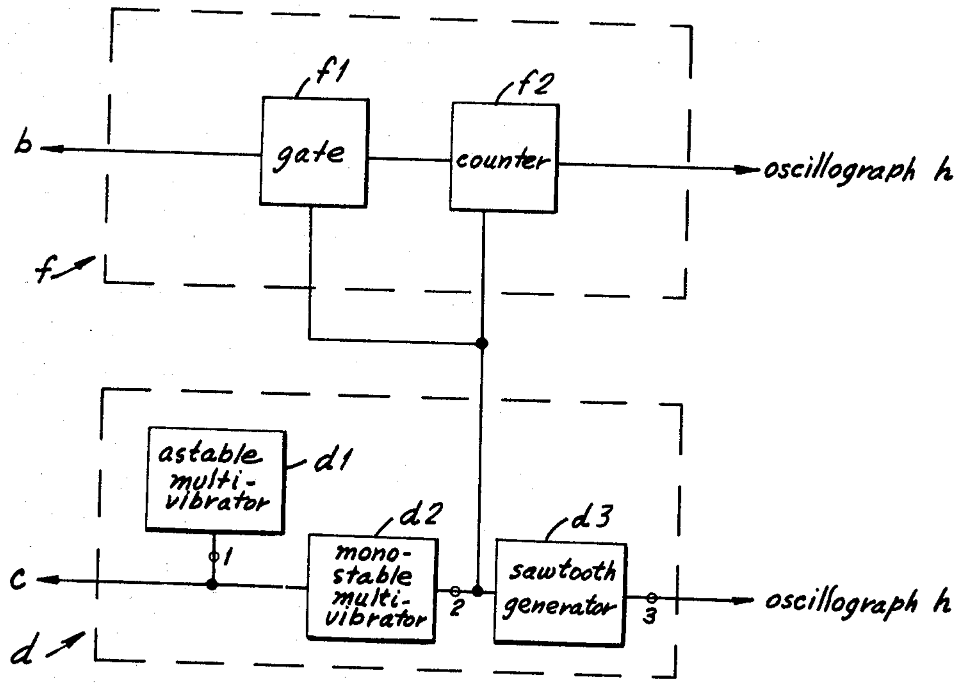
FIG. 3 is a block diagram illustrating the internals of an oscillator and a counting means included in the apparatus shown in FIG. 1.
Figure 4A:
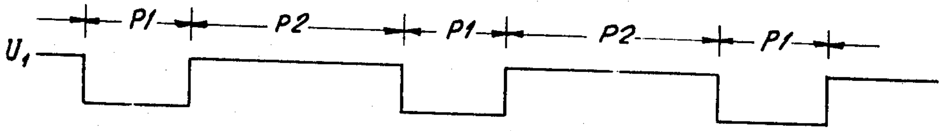
FIG. 4*a* is a graphical illustration of the pulse train produced by the astable multi-vibrator *d1* included in the oscillator.
Figure 4B:
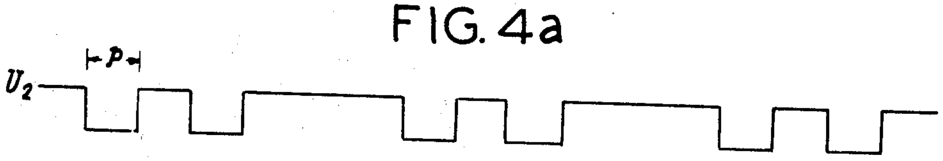
FIG. 4*b* is a graphical illustration of the pulses produced by the monostable multi-vibrator *d*2 forming part of the oscillator.
Figure 4C:
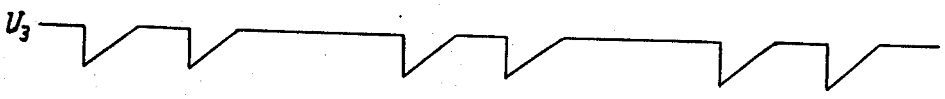
FIG. 4*c* is a graphical illustration of the output pulses produced by the sawtooth generator *d*3 included in the oscillator.

FIG. 3 shows the internals of the block *f* representative of the counting means and the block *d* representing the oscillator in FIG. 1, and FIGS. 4*a*, 4*b* and 4*c* show the various voltage wave forms produced. Referring to FIG. 3, the counting means *f* is illustrated as including a gate *f*1 and a counter *f*2, the counting means *f* being connected between the receiver *b* and oscillograph *h*. The oscillator block *d* is illustrated as containing an astable multi-vibrator *d*1, a monostable multi-vibrator *d*2 and a sawtooth generator *d*3. This oscillator block *d* is illustrated, in FIG. 3, as connected between high frequency generator $c$ and oscillograph $h$. The junction of monostable multi-vibrator $d2$ and sawtooth generator $d3$ is connected to gate $f1$ of counting means $f$.

With the arrangement of FIG. 3, and in accordance with the invention, the sounding periods P1 and P2 are determined by the asymmetrical astable multi-vibrator $d1$. This astable multi-vibrator $d1$ produces the voltage wave form, or pulse train, as illustrated at $U_1$ in FIG. 4*a*. The high frequency generator $c$ and the receiving portion of the apparatus are synchronized by the flanks of the pulses of the electric potential $U_1$.

Monostable multi-vibrator $d2$ produces the potential $U_2$. At each transmitted pulse, monostable multi-vibrator $d2$ opens, during only the receiving portions or intervals $p$, gate $f1$ in counting means $f$, and simultaneously triggers sawtooth generator $d3$ to provide the potential $U_3$. At the end of a receiving portion $p$, monostable multi-vibrator $d2$ block gate $f1$. However, echo signals received during the small time interval $p$ pass through gate $f1$ and are processed in counter $f2$. This counter, as stated, counts the number of intervals P during which impulses are received in periods $p$ and, only after a plurality of successive interval P during which impulses are received in periods $p$, such as three intervals P, does the counter allow a received echo signal to proceed to oscillograph $h$.

The counter used with the present invention is a shift register of a usual known construction. As will be understood by those skilled in the art, such a shift register has two inputs. The first input delivers the impulses X, Y and E into the counter and the second input applies the square impulses $U_2$ (FIG. 4*b*) to the counter or shift register. It is only if both inputs simultaneously supply impulses to the shift register that the latter will count on additional number and will provide, for example after three such simultaneously impulses, an output impulse to the cathode ray tube $h$.

A shift register of the type just mentioned is used in U.S. Patent No. 3,258,753, issued June 28, 1966 on an application filed Aug. 24, 1962 and which application has the same priority date as the instant application.

It will be appreciated that, within the scope of the invention, there are possible many modifications and variations in the method. In particular, various kinds of counting arrangements can be used for counting the selected periods with received impulses or for establishing the frequency of such periods. Such counting arrangements may work in accordance with an impulse storage function. However it should be borne in mind that it is not the number of impulses occurring in a selected receiving portion of the length $p$ which is decisive, but only the number of selected receiving portions in which receiving impulses of the prescribed amplitude occur at all, regardless of whether only one or several receiving impulses occur in such a selected receiving portion or measurement.

While specific embodiments of the invention have been shown and described in detail to illustrate the application of the principles of the invention, it will be understood that the invention may be embodied otherwise without departing from such principles.

What is claimed is:

1. In underwater sound echo ranging operations in which impulses are transmitted at the start of successive sounding periods each including a sound receiving portion with the sound receiving portions having lengths corresponding to a selected sounding range, and the distance of an object within a selected sounding range is determined by measuring the elapsed time, during a sound receiving portion, at which a transmitted impulse reflected by the object is received as an echo impulse; the method of discriminating between the desired echo impulses reflected from the object and received disturbance impulses, comprising the steps of transmitting impulses at the start of successive sounding periods having lengths, between successive transmitted impulses, corresponding to a sounding range which is a multiple of the selected sounding range; counting only those impulses received during a selected limited sound receiving portion of each sounding period, having a length which is a fraction of that of the associated sounding period; counting the successive sound receiving portions; and measuring the elapsed time, at which an echo impulse, responsive to a transmitted pulse indicating a sounding period, is received in the sound receiving portion of the associated sounding period, only after impulses are received in the sound receiving portions of a predetermined plurality of immediately successive sounding periods.

2. The method of discriminating between the desired echo impulses and received disturbance impulses, as claimed in claim 1, in which each sound receiving portion is an initial portion of each sounding period.

3. The method of discriminating between the desired echo impulses and received disturbance impulses, as claimed in claim 2, including the step of using successive sounding periods of different respective lengths in such a manner that periodically recurring disturbance impulses which, with equal length sounding periods, would be received during a sound receiving portion, are received outside such sound receiving portion.

4. The method of discriminating between the desired echo impulses and received disturbance impulses, as claimed in claim 3, in which the selection of the lengths of successive sounding periods is effected in a periodic manner.

5. In underwater sound echo ranging operations in which impulses are transmitted at the start of successive sounding periods each including a sound receiving portion with the sound receiving portions having lengths corresponding to a selected sounding range, and the distance of an object within the selected sounding range is determined by measuring the elapsed time during a sound receiving portion, at which a transmitted impulse reflected by the object is received as an echo impulse; apparatus for discriminating between the desired echo impulses reflected from the object and received disturbance impulses comprising, in combination, means for transmitting impulses at the start of successive sounding periods having lengths, between successive transmitted impulses, corresponding to a sounding range which is a multiple of a selected sounding range, and with the lengths of successive sounding periods differing from each other; a receiver for reflected impulses; counting means connected to said transmission means and to said receiver; means controlling said counting means to count only those pulses received during a selected limited sound receiving portion of a sounding period, having a length which is a fraction of the length of the associated sounding period; and measuring means connected to said counting means and effective to measure the elapsed time at which an impulse, received by said receiver and transmitted to said counting means, is transmitted to said measuring means; said controlling means controlling said counting means to transmit received impulses to said measuring means only after impulses are received in the sound receiving portions of a predetermined plurality of immediately successive sounding periods.

6. Underwater sound echo ranging apparatus comprising, in combination, a sound transmitting transducer; a generator coupled to said sound transmitting transducer to operate the latter to emit sonic pulses tolling the starts of successive sounding periods each including a time limited sound receiving portion; a sound receiving transducer for receiving and transducing echo sonic pulses; counting means connected to said sound receiving transducer to count the pulses received by the latter; an indicating arrangement coupled to said counting means to receive pulses transmitted by said sound receiving transducer to said counting means; said counting means transmitting received pulses to said indicating means only after impulses are received in the sound receiving portions of a predetermined plurality of immediately successive sounding periods; an oscillator coupled to said generator and to said counting means; said oscillator controlling said counting means to count only those pulses received during a selected limited sound receiving portion of a sounding period, which portion has a length which is a fraction of that of the associated sounding period; said oscillator controlling said generator to actuate said sound transmitting transducer to emit a sonic pulse at the start of successive sounding periods, with successive sounding periods having lengths, between successive transmitted sonic pulses, which differ from each other and the smallest of which lengths is greater than the length of said selected sound receiving portion of a sounding period.

References Cited

UNITED STATES PATENTS 3,277,473 10/1966 Calhoon et al. ........ 343—13

RICHARD A. FARLEY, *Primary Examiner.*

U.S. Cl. X.R.

343—13